US009438805B2

(12) United States Patent
Takatsuka et al.

(10) Patent No.: US 9,438,805 B2
(45) Date of Patent: Sep. 6, 2016

(54) TERMINAL DEVICE AND IMAGE CAPTURING METHOD

(71) Applicant: Sony Mobile Communications, Inc., Tokyo (JP)

(72) Inventors: Susumu Takatsuka, Tokyo (JP); Tetsuya Naruse, Tokyo (JP); Yuji Ide, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 13/904,757

(22) Filed: May 29, 2013

(65) Prior Publication Data

US 2013/0329113 A1  Dec. 12, 2013

Related U.S. Application Data

(60) Provisional application No. 61/657,278, filed on Jun. 8, 2012.

(51) Int. Cl.
| | |
|---|---|
| *H04N 5/222* | (2006.01) |
| *H04N 5/232* | (2006.01) |
| *G06F 3/01* | (2006.01) |
| *G06F 3/00* | (2006.01) |
| *G06F 3/03* | (2006.01) |

(52) U.S. Cl.
CPC .......... *H04N 5/23293* (2013.01); *G06F 3/005* (2013.01); *G06F 3/017* (2013.01); *G06F 3/0304* (2013.01); *H04N 5/23219* (2013.01)

(58) Field of Classification Search
CPC ............. H04N 5/23293; H04N 5/225; H04N 5/23219

USPC ........................................ 348/333.12, 333.01
See application file for complete search history.

(56) References Cited

U.S. PATENT DOCUMENTS

| | | | | |
|---|---|---|---|---|
| 2004/0196400 | A1* | 10/2004 | Stavely et al. | 348/333.01 |
| 2005/0271279 | A1* | 12/2005 | Fujimura et al. | 382/203 |
| 2008/0089587 | A1* | 4/2008 | Kim et al. | 382/190 |
| 2008/0309799 | A1* | 12/2008 | Imata | 348/240.3 |
| 2009/0079813 | A1 | 3/2009 | Hildreth | |
| 2009/0303176 | A1* | 12/2009 | Chen et al. | 345/156 |

(Continued)

FOREIGN PATENT DOCUMENTS

| | | | | |
|---|---|---|---|---|
| JP | 2005051472 A | * | 2/2005 | ............. H04N 5/232 |
| JP | 2011-008397 | | 1/2011 | |
| WO | WO 2010/141023 A1 | | 12/2010 | |

OTHER PUBLICATIONS

Search Report issued Mar. 25, 2014 in European Patent Application No. 13169997.7

*Primary Examiner* — Tuan Ho
*Assistant Examiner* — Zhenzhen Wu
(74) *Attorney, Agent, or Firm* — Oblon, McClelland, Maier & Neustadt, L.L.P.

(57) ABSTRACT

An information processing apparatus that acquires image data captured by an image capturing device; performs an analysis on the image data prior to cropping the image data for display to detect a specified image from the image data; generates an image for display by cropping the image data; controls a display to display the image for display; and executes predetermined processing when the specified image is detected in the image data as a result of performing the analysis on the image data prior to the cropping.

13 Claims, 8 Drawing Sheets

(56) References Cited

U.S. PATENT DOCUMENTS

| | | | |
|---|---|---|---|
| 2010/0013943 A1* | 1/2010 | Thorn | 348/222.1 |
| 2011/0254972 A1 | 10/2011 | Yaguchi | |
| 2012/0026277 A1 | 2/2012 | Malzbender et al. | |
| 2012/0075534 A1* | 3/2012 | Katz et al. | 348/602 |
| 2012/0162476 A1* | 6/2012 | Onoda | 348/231.99 |
| 2012/0224070 A1* | 9/2012 | Burroff et al. | 348/207.1 |
| 2012/0281129 A1* | 11/2012 | Wang et al. | 348/333.01 |
| 2013/0021491 A1* | 1/2013 | Lee et al. | 348/222.1 |
| 2013/0027503 A1 | 1/2013 | Hildreth | |

* cited by examiner

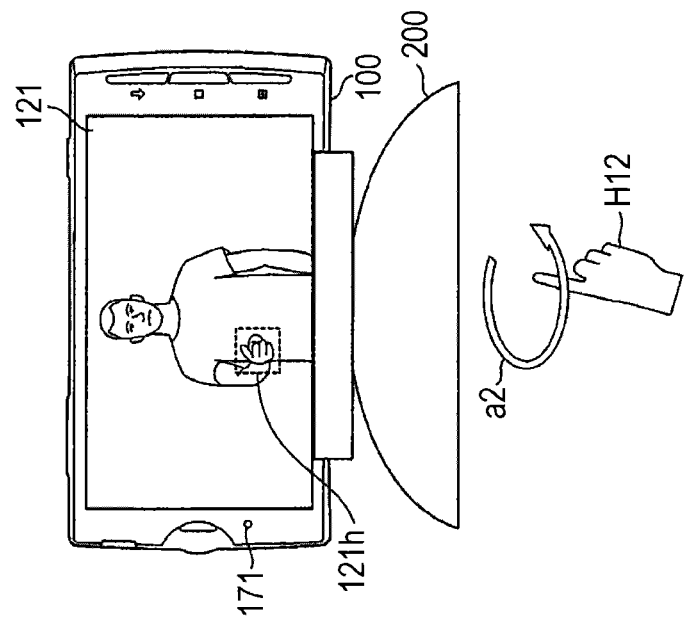
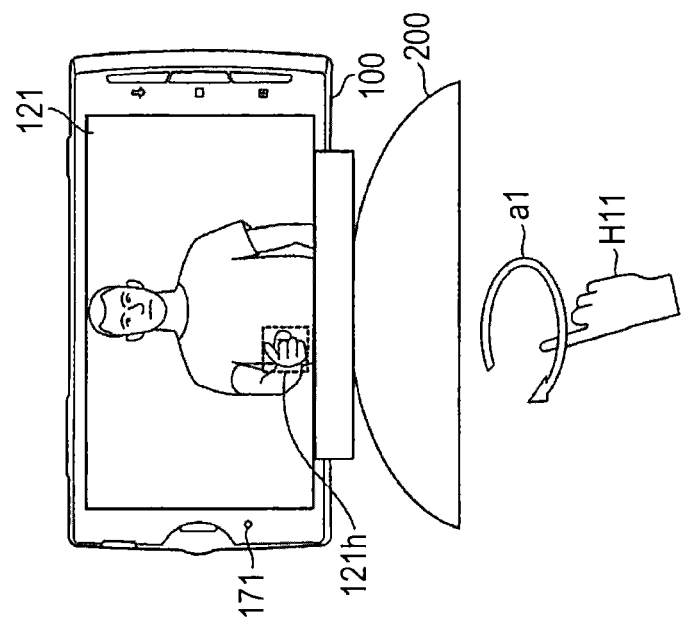

TERMINAL DEVICE AND IMAGE CAPTURING METHOD

CROSS REFERENCE TO RELATED APPLICATION

The present application claims the benefit of the earlier filing date of U.S. Provisional Patent Application Ser. No. 61/657,278 filed on Jun. 8, 2012, the entire contents of which is incorporated herein by reference.

BACKGROUND

1. Field of the Disclosure

The present disclosure relates to a terminal device including a camera unit, and an image capturing method applied to the terminal device.

2. Description of Related Art

In recent years, advanced mobile phone terminal devices referred to as smart phones have become widely available. The smart phone includes a camera unit, and an image captured with the camera unit is displayed on a display panel, and stored in an internal memory.

The camera unit provided in the mobile phone terminal device is used as an ordinary camera capturing images of a person, a landscape, and so forth. In addition, the camera unit may be used as a sensor for image recognition. For example, the camera unit captures the image of a barcode printed on a paper or the like, which allows the mobile phone terminal device to decode a character or a sign represented as the barcode.

When used for a video game, etc., the camera unit captures an image and the motion or the like of a target subject may be detected using the image.

In Japanese Unexamined Patent Application Publication No. 2011-8397, an example where an image captured with a camera unit of a mobile phone terminal device is used for a purpose other than display and storage is mentioned. According to the example in Japanese Unexamined Patent Application Publication No. 2011-8397, there is a mention of giving support for makeup or the like by capturing the image of a face through the camera unit of the mobile phone terminal device, and processing the captured face image.

SUMMARY

A captured image that is used by the mobile phone terminal device to perform various types of processing through the use of the camera unit provided therein is the same as an image that is captured and displayed on the display panel. For example, when the mobile phone terminal device captures the image of a barcode and performs processing of recognizing the barcode, a user adjusts the angle of view, the image capture direction, etc. so that the barcode is included in the captured image displayed on the display panel.

However, in the case where the image displayed on the display panel in that manner agrees with a recognition target, there may be an inappropriate case depending on the mode of use.

The inventors perceive the need for appropriately recognizing an image, using a terminal device including a camera unit and an image capturing method, independently of the zoom state of the camera unit.

A terminal device of the present disclosure acquires image data captured by an image capturing device; performs an analysis on the image data prior to cropping the image data for display to detect a specified image from the image data; generates an image for display by cropping the image data; controls a display to display the image for display; and executes predetermined processing when the specified image is detected in the image data as a result of performing the analysis on the image data prior to the cropping.

According to the present disclosure, the image analysis is performed based on an entire image captured with the camera unit independently of the zoom state of an image provided to perform display or storage. Consequently, it becomes possible to give an instruction of specified processing by means of a sign, such as moving a hand, in the state where an image obtained by zooming up on a face, etc. is displayed.

BRIEF DESCRIPTION OF DRAWINGS

FIGS. 5A and 5B are diagrams illustrating exemplary hand signs and motions according to an embodiment of the present disclosure.

DETAILED DESCRIPTION

Examples of a terminal device and an image capturing method according to an embodiment of the present disclosure will be described with reference to drawings in the following order.

1. Configuration of terminal device (FIG. 1 to FIG. 3)
2. Exemplary processing performed based on hand signs (FIG. 4 to FIG. 6)
3. First exemplary modification (FIGS. 7A and 7B)
4. Second exemplary modification (FIGS. 8A-8B)
5. Other exemplary modifications

[1. Configuration of Terminal Device]

Figure 1:
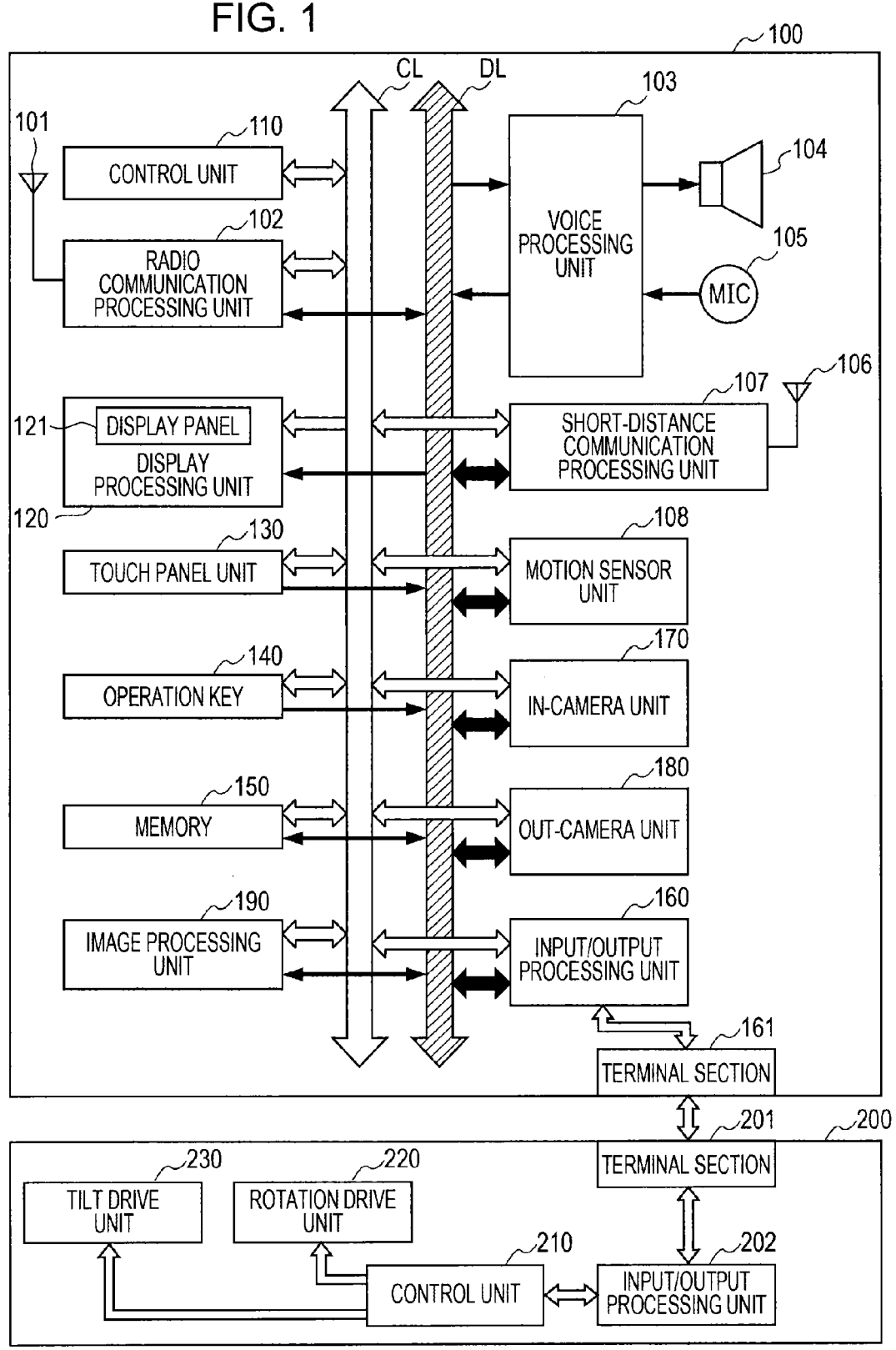
FIG. 1 is a block diagram illustrating exemplary configurations of a terminal device and a camera base according to an embodiment of the present disclosure.
Figure 2:
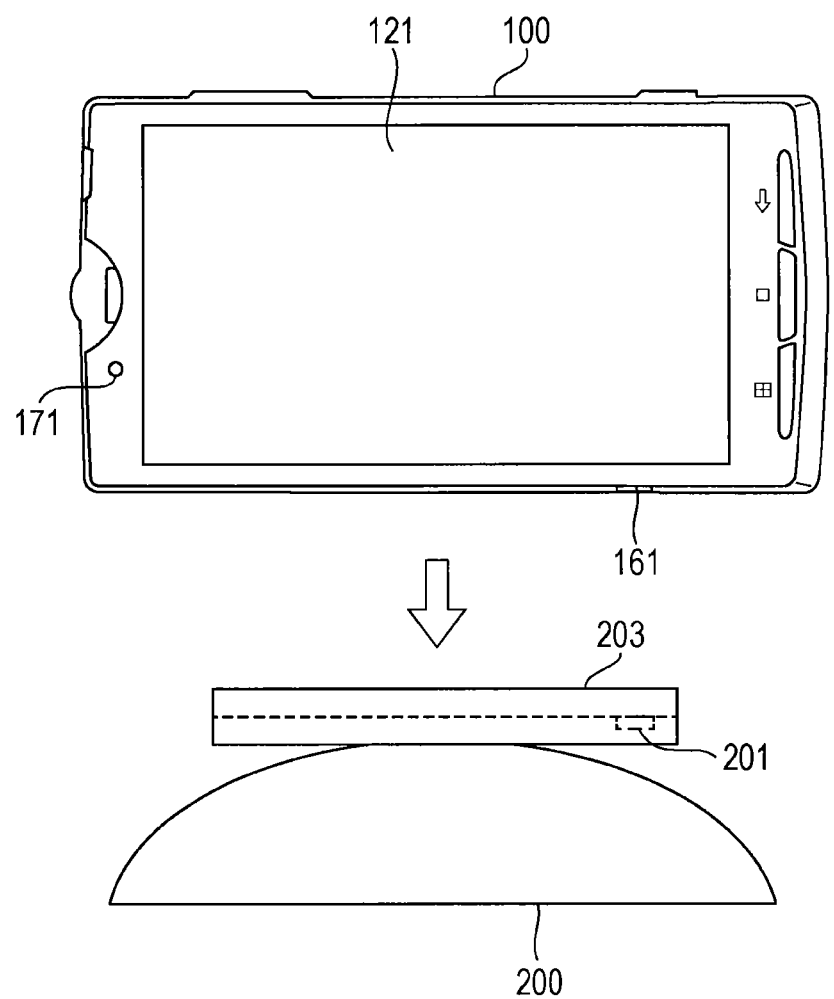
FIG. 2 is a diagram illustrating exemplary external forms of a terminal device and a camera base according to an embodiment of the present disclosure.
Figure 3B:
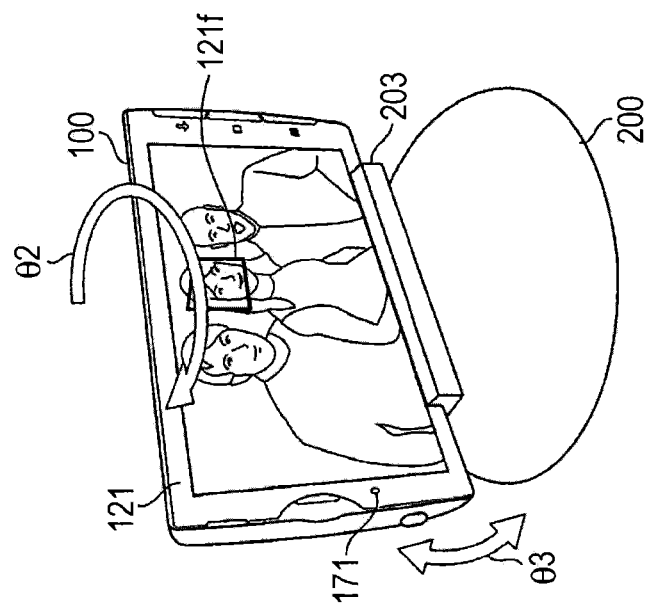
FIGS. 3A and 3B are diagrams illustrating exemplary driven states of the terminal device according to an embodiment of the present disclosure.
Figure 3A:
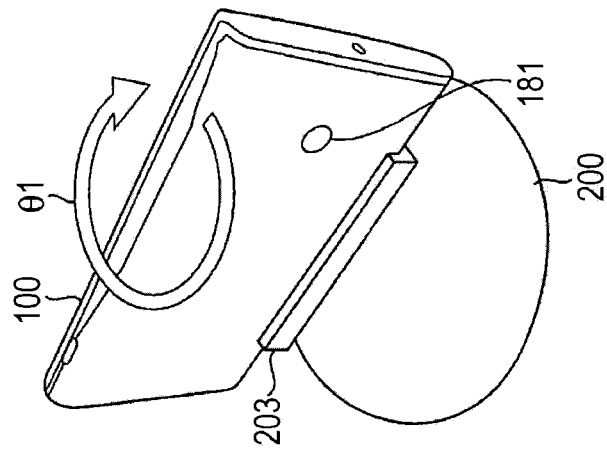

FIG. 1 is a diagram illustrating exemplary configurations of a mobile phone terminal device 100 and a camera base 200 of the present disclosure. FIG. 2 is a diagram illustrating exemplary external forms of the mobile phone terminal device 100 and the camera base 200. FIGS. 3A and 3B are diagrams illustrating examples where the camera base 200 holds the mobile phone terminal device 100.

The mobile phone terminal device 100 is an advanced terminal device referred to as a smart phone, for example, and has two built-in camera units including an in-camera unit 170 and an out-camera unit 180. The camera base 200 is a base holding a terminal device including camera units, such as the mobile phone terminal device 100. The direction and angle of elevation of the terminal device held by the camera base 200 can be changed based on instructions from the terminal device.

The mobile phone terminal device 100 includes an antenna 101 to wirelessly communicate with a base station for radio-telephone. The antenna 101 is connected to a radio communication processing unit 102. The radio communication processing unit 102 performs processing of the transmission and reception of a radio signal under control of a control unit 110. The control unit 110 transmits a control instruction to the radio communication processing unit 102 via a control line CL. The control unit 110 reads a program (software) stored in a memory 150 via the control line CL and executes the program to control each unit of the mobile phone terminal device 100. The memory 150 included in the mobile phone terminal device 100 stores prepared data, such as a program, and data generated based on a user operation. The data is stored in and read from the memory 150 under control of the control unit 110.

Voice data for conversation, which is received by the radio communication processing unit 102 during voice conversation, is supplied to a voice processing unit 103 via a data line DL. The voice processing unit 103 performs demodulation processing on the supplied voice data to obtain an analog voice signal. The analog voice signal obtained with the voice processing unit 103 is supplied to a speaker 104, and voice is output from the speaker 104.

Further, the voice processing unit 103 converts a voice signal output from a microphone 105 into voice data in transmission format at during conversation. Then, the voice data converted with the voice processing unit 103 is supplied to the radio communication processing unit 102 via the data line DL. Further, the voice data supplied to the radio communication processing unit 102 is packetized and transmitted by radio.

When performing data communications or transmitting/receiving a mail via a network such as the Internet, the radio communication processing unit 102 performs processing of transmission/reception under control of the control unit 110. For example, data received by the radio communication processing unit 102 is stored in the memory 150, and processing such as display is performed based on the stored data, under control of the control unit 110. Further, the data stored in the memory 150 is supplied to the radio communication processing unit 102 and transmitted by radio. When it is necessary to abandon the data of a received mail, the control unit 110 deletes the data stored in the memory 150.

The mobile phone terminal device 100 includes a display processing unit 120. The display processing unit 120 displays video or various types of information on a display panel 121 under control of the control unit 110. The display panel includes a liquid crystal display panel, or an organic EL (Electro-Luminescence) display panel, for example.

Further, the mobile phone terminal device 100 includes a touch panel unit 130. When the surface of the display panel 121 is touched by an object including a finger, a pen, and so forth, the touch panel unit 130 detects the touched position. The touch panel unit 130 includes, for example, a capacitance touch panel.

Data of the touched position detected with the touch panel unit 130 is transmitted to the control unit 110. The control unit 110 executes a running application based on the supplied touched position.

Further, the mobile phone terminal device 100 includes an operation key 140. The operation information of the operation key 140 is transmitted to the control unit 110. Here, most of operations of the mobile phone terminal device 100 is performed through a touch panel operation achieved by using the touch panel unit 130, and the operation key 140 only performs part of the operations.

Further, the mobile phone terminal device 100 includes a short-distance communication processing unit 107 to which an antenna 106 is connected. The short-distance communication processing unit 107 performs short-distance communications with a nearby terminal device or access point. The short-distance communication processing unit 107 performs radio communications with a destination which is in a range of about several tens of meters, for example, by employing a wireless LAN (Local Area Network) system defined as IEEE 802.11 standard, etc.

Further, the mobile phone terminal device 100 has a motion sensor unit 108. The motion sensor unit 108 includes a sensor detecting the motion or direction of the device, such as an acceleration sensor, a magnetic field sensor, etc. The acceleration sensor detects accelerations that are measured in three directions including a length, a width, and a height, for example. Data detected with the motion sensor unit 108 is supplied to the control unit 110. The control unit 110 determines the state of the mobile phone terminal device 100 based on the data supplied from the motion sensor unit 108. For example, the control unit 110 determines whether a cabinet constituting the mobile phone terminal device 100 is vertically oriented or horizontally oriented based on the data supplied from the motion sensor unit 108, and controls the orientation of an image displayed on the display panel 121.

Further, the mobile phone terminal device 100 includes an input/output processing unit 160. A terminal section 161 is connected to the input/output processing unit 160, and the input/output processing unit 160 performs input processing and output processing of data with a device connected to the terminal section 161. In the example of FIG. 1, the terminal section 161 is connected to a terminal section 201 of the camera base 200. The connection between the terminal section 161 of the mobile phone terminal device 100 and the terminal section 201 of the camera base 200 is established through the direct connection between the terminal sections 161 and 201. However, the connection between the terminal sections 161 and 201 may be established through a transmission cable.

Further, the mobile phone terminal device 100 has the two camera units including the in-camera unit 170 and the out-camera unit 180. The in-camera unit 170 is a camera unit capturing an image of an inside when a side on which the display panel 121 of the mobile phone terminal device 100 is provided is determined to be the inside. The out-camera unit 180 is a camera unit capturing an image of an outside which is a side opposite to the side on which the display panel 121 is provided. Lenses 171 and 181 (FIGS. 3A and 3B) that are included in the camera units 170 and 180, respectively, are provided, for example, as wide-angle lenses, which allow the camera units 170 and 180 to capture images of relatively wide areas.

The control unit 110 performs control to switch image capturing between the image capturing performed through the in-camera unit 170 and that performed through the out-camera unit 180.

The data of images that are captured with the in-camera unit 170 and the out-camera unit 180 is supplied to an image processing unit 190. The image processing unit 190 converts the supplied image data into image data of the size (pixel number) for storage. Further, the image processing unit 190 performs processing to set the zoom state where the image of a specified range is cut from the image data captured with the camera units 170 and 180, and enlarged. The zoom processing performed through the image cutting is referred to as digital zooming.

Further, the image processing unit 190 performs processing to analyze the captured image, and processing to determine the details of the image. For example, the image processing unit 190 performs processing to detect the face of a person included in the image. Information about the face detected with the image processing unit 190 is supplied to the control unit 110. The control unit 110 controls the image capturing state of a range that should be brought into focus, etc. based on the supplied face information.

Further, the image processing unit 190 performs processing to detect a predetermined specified hand gesture from the image. In that case, an area from which the image processing unit 190 detects the specified hand gesture is determined to be the entire area of an image detected with the in-camera unit 170 regardless of an enlarged state during the above-described digital zoom processing. That is, the image processing unit 190 detects the specified hand gesture from a wide-angle image captured with the in-camera unit 170.

Information about the hand gesture detected with the image processing unit 190 is supplied to the control unit 110. The control unit 110 controls the image capturing state based on the supplied hand gesture information. A specific example where the control unit 110 controls the image capturing state based on the hand gesture detection will be described later.

The in-camera unit 170 and the out-camera unit 180 capture images at regular intervals of thirty frames per second, etc. An image captured by a running camera unit out of the in-camera unit 170 and the out-camera unit 180 is displayed on the display panel 121. Then, the control unit 110 stores in the memory 150 an image captured at the time when a shutter button operation (shooting operation) performed by a user is detected. The shooting operation is performed through the use of the touch panel unit 130, for example. Further, in the state where the camera base 200 is connected, which will be described later, the control unit 110 automatically controls image capturing.

The in-camera unit 170 and the out-camera unit 180 may include a flash unit which illuminates a subject by emitting light at the shooting time when a captured image is stored in the memory 150.

Next, the configuration of the camera base 200 will be described with reference to FIG. 1.

The camera base 200 is a device provided to hold the mobile phone terminal device 100, and has the terminal section 201 connected to the terminal section 161 of the held mobile phone terminal device 100. An input/output processing unit 202 performs communications with the mobile phone terminal device 100 via the terminal section 201. Information received by the input/output processing unit 202 is supplied to a control unit 210. Further, the information supplied from the control unit 210 to the input/output processing unit 202 is transmitted from the terminal section 201 to the mobile phone terminal device 100 side.

The control unit 210 controls a rotation by a rotation drive unit 220, and controls a tilt angle formed by a tilt drive unit 230. The rotation drive unit 220 includes a motor provided to rotate the mobile phone terminal device 100 held by the camera base 200, and sets the rotation angle of the mobile phone terminal device 100 to an angle specified from the control unit 210. The tilt drive unit 230 includes a drive mechanism that makes the tilt angle of the mobile phone terminal device 100 held by the camera base 200 variable, and sets the tilt angle to an angle specified from the control unit 210.

FIG. 2 is a diagram illustrating an exemplary form of the mobile phone terminal device 100.

The mobile phone terminal device 100, which is configured as a smart phone, has the display panel 121 arranged on the surface of a vertically oriented cabinet. Note that, in FIG. 2, the mobile phone terminal device 100 placed in the horizontally oriented state is illustrated.

The lengths of diagonals of the display panel 121 are about 10 centimeters, for example. The display processing unit 120 drives the display panel 121 to perform display thereon. Further, the touch panel unit 130 detects the touch of a finger, etc. on the surface of the display panel 121. Further, the mobile phone terminal device 100 has a lens 171 of the in-camera unit 170 (FIG. 1), which is arranged adjacent to the display panel 121. The arrangement of the lens 171 allows the in-camera unit 170 to capture an image of the side on which the display panel 121 is provided. Further, though not illustrated, the lens of the out-camera unit 180 (FIG. 1) is arranged on the face opposite to the face on which the display panel 121 is provided.

Then, the mobile phone terminal device 100 is placed on a terminal holding part 203 provided on the upper side of the camera base 200, as illustrated in FIG. 2. Placing the mobile phone terminal device 100 on the terminal holding part 203 causes the terminal section 161 of the mobile phone terminal device 100 and the terminal section 201 of the camera base 200 to be connected. In the connection state, the rotation position or tilt angle of the camera base 200 is set based on instructions from the mobile phone terminal device 100.

FIGS. 3A and 3B are perspective views illustrating the state where the mobile phone terminal device 100 is held by the camera base 200. As illustrated in FIGS. 3A and 3B, the camera base 200 retains the display panel 121 of the mobile phone terminal device 100 in a nearly upright state, and rotates in horizontal directions as indicated by arrows θ1 and θ2.

Further, the tilt angle of the mobile phone terminal device 100 is variable as indicated by an arrow θ3. Here, in the state where the mobile phone terminal device 100 is held by the camera base 200 as illustrated in FIGS. 3A and 3B, the in-camera unit 170 performs image capturing, and an image captured with the in-camera unit 170 is displayed on the display panel 121. As illustrated in FIG. 3B, the lens 171 of the in-camera unit 170 and the display panel 121 are arranged on the same surface of the cabinet. Consequently, the in-camera unit 170 can capture the image of a person who is in front of the mobile phone terminal device 100, and the person who is being subjected to the image capturing can be confirmed based on an image displayed on the display panel 12, which is being captured. When the image processing unit 190 detects the person's face from the image captured with the in-camera unit 170, a frame 121f indicating the face displayed on the display panel 121 is displayed as illustrated in FIG. 3B. The lens 181 of the out-camera unit 180 is arranged on a face opposite to the face on which the display panel 121 is provided as illustrated in FIG. 3A.

Then, the control unit 110 controls the image capturing based on the detected state of the shape or motion of a hand of the user.

[2. Exemplary Processing Performed Based on Hand Signs]

Figure 4:
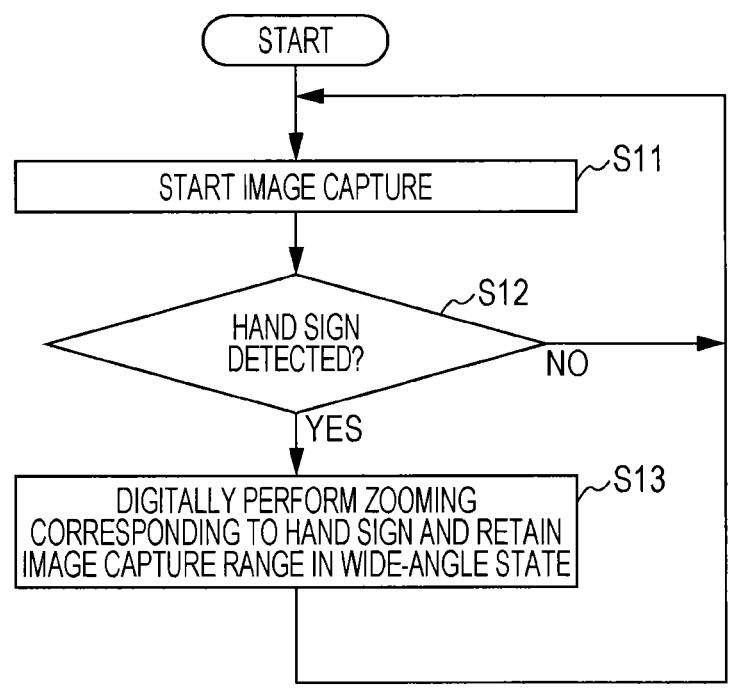
FIG. 4 is a flowchart illustrating exemplary control performed during the image capturing according to an embodiment of the present disclosure.

A flowchart of FIG. 4 illustrates processing performed by the in-camera unit 170 that captures an image in the state where the mobile phone terminal device 100 is held by the camera base 200. The image capturing with the in-camera unit 170 is controlled by the control unit 110. An image captured with the in-camera unit 170 is displayed on the display panel 121.

First, the control unit 110 starts image capturing with the in-camera unit 170 (step S11). When the image capturing is started, the image processing unit 190 that processes an image captured with the in-camera unit 170 selects a wide-angle state where the angle of view is maximized as the zoom processing state, and changes the zoom processing state in accordance with a user operation.

Then, the control unit 110 determines whether or not a hand sign is detected from a captured image through the image analysis performed with the image processing unit 190 (step S12). Here, the hand sign denotes a sign including a predetermined shape or motion of a hand, or a combination of the shape and the motion of the hand. Specific examples of the hand sign will be described later. When no hand sign is detected through the determination made at step S12, the control unit 110 continuously performs the image capture at step S11.

Then, when the hand sign is detected at step S12, the control unit 110 performs operation control corresponding to the hand sign (step S13). At that time, when the zoom-processing state includes zoom-in processing of enlarging an image from the wide-angle state, the image processing unit 190 determines the range of an image cut from the captured image in accordance with the zoom magnification. The image displayed on the display panel 121 is changed to the cut image. Further, at the shooting time, the memory 150 stores the image cut with the image processing unit 190 in accordance with the zoom magnification at that time. Further, the area from which the image processing unit 190 detects the hand sign at step S13 corresponds to an entire image captured with the in-camera unit 170 regardless of the zoom magnification at that time.

Then, after performing the control corresponding to the hand sign at step S13, the control unit 110 returns to the processing of step S11.

Next, an example of the hand sign detected at step S13 of the flowchart of FIG. 4 will be described. According to an example of the present disclosure, a hand sign made to control the image capturing state is predetermined, and the image processing unit 190 detects a hand sign of the predetermined pattern from a captured image. The hand sign made to control the image capturing state includes, for example, the following hand signs described in (a) to (e):
 (a) a hand sign made to specify a horizontal rotation of the camera base 200;
 (b) a hand sign made to specify an increase or decrease in the tilt angle of the camera base 200;
 (c) a hand sign made to specify zooming of a captured image;
 (d) a hand sign made to specify an image frame; and
 (e) a hand sign made to perform shooting control.

The user that is the subject moves his/her own hand to make these hand signs. Consequently, the image processing unit 190 of the mobile phone terminal device 100 detects the hand signs through the image recognition, and the control unit 110 performs the corresponding control.

Next, an example where the zoom state is controlled will be described, as an exemplary hand sign.

FIGS. 5A and 5B illustrate exemplary hand signs that are made to control the zoom state. FIG. 5A illustrates a zoom-in hand sign H11, and FIG. 5B illustrates a zoom-out hand sign H12.

FIG. 5A illustrates the hand sign H11 of placing a single finger in an upright position and rotating the tip of the upright finger counterclockwise. The image processing unit 190 detects the hand sign H11, which causes the control unit 110 to issue a zoom-in instruction to the image processing unit 190. With the issued zoom-in instruction, an image displayed on the display panel 121 is gradually enlarged, and an image stored at the shooting time is also enlarged correspondingly.

FIG. 5B illustrates the hand sign H12 of placing a single finger in an upright position and rotating the tip of the upright finger clockwise. When the image processing unit 190 detects the hand sign H12, the control unit 110 issues a zoom-out instruction to the in-camera unit 170 or the image processing unit 190. With the issued zoom-out instruction, an image displayed on the display panel 121 is gradually reduced, and the image stored at the shooting time is also reduced correspondingly.

In each of the examples illustrated in FIGS. 5A and 5B, the hand of the subject making the hand sign is displayed in the image on the display panel 121. Here, the mobile phone terminal device 100 of the present disclosure detects a hand sign from the image of an entire range, the image being captured with the in-camera unit 170.

Figure 6:
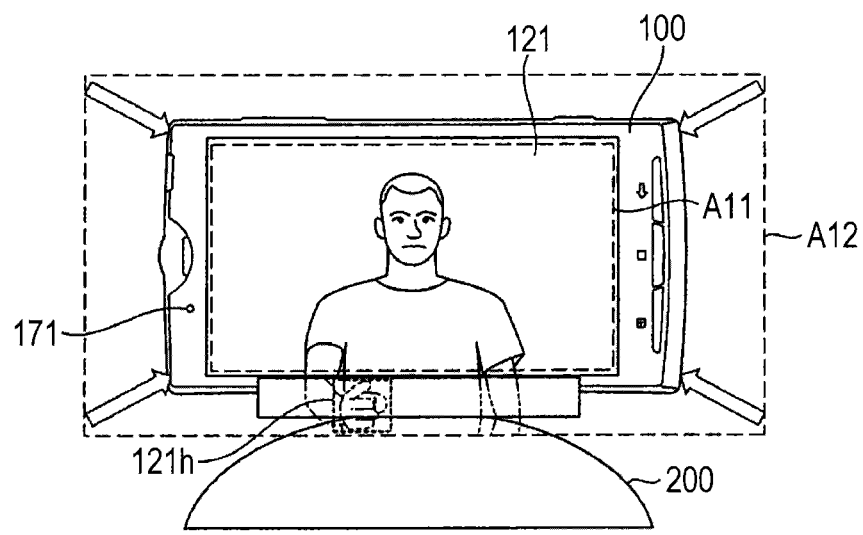
FIG. 6 is a diagram illustrating an exemplary image capture range and an exemplary display range according to an embodiment of the present disclosure.

FIG. 6 is a diagram illustrating an example where the image processing unit 190 detects a hand sign from an area outside the display range of the display panel 121.

In the example of FIG. 6, an image A11 displayed on the display panel 121 is a zoomed-in image obtained by enlarging the center part of an image A12 captured with the in-camera unit 170. At the shooting time, the data of the image A11 cut from the image A12 is stored in the memory 150. In FIG. 6, the range of the image A12 is virtually indicated by a broken line.

At that time, the image processing unit 190 detects through the image analysis a hand sign 121h from the image A12 of the entire range which is captured and acquired with the in-camera unit 170.

For example, as illustrated in FIG. 6, the image processing unit 190 detects the hand sign 121h within the image A12 outside the display image A11. At that time, the control unit 110 determines the details of an instruction based on the shape or motion of the hand, which is detected with the image processing unit 190 as the hand sign 121h.

On the basis of the detection of the hand sign 121h, the control related to image capturing, such as the zoom-in or the zoom-out, is performed, as is the case with the examples of FIGS. 5A and 5B. For example, when the zoom-in hand sign is detected from a result of the image analysis made by the image processing unit 190, the control unit 110 issues a zoom-in instruction to the image processing unit 190. With the issued zoom-in instruction, an image displayed on the display panel 121 is gradually enlarged and an image stored at the shooting time is also enlarged correspondingly. The zoom-in is one example of operations indicated by the hand signs, and the image processing unit 190 can detect any of the hand signs that had already been described in (a) to (e).

Thus, since the hand sign is detected from a wide-angle image captured with the in-camera unit 170 even though an image that is displayed and stored through the zoom processing becomes a part of the captured image range, the mobile phone terminal device 100 of the present disclosure appropriately issues an operation instruction by means of the hand sign. For example, even though the zoom processing is performed so as to enlarge the area around the face of a person that is a subject, the mobile phone terminal device 100 can detect a hand sign made by the motion of a hand of the person, so that an operability achieved by means of the hand sign is ensured. Particularly, the image capturing is allowed while the hand of the person that is the subject is not displayed, the mobile phone terminal device 100 of the present disclosure can attain both the operability achieved by means of the hand sign and the flexibility of composition.

[3. First Exemplary Modification]

Figure 7A:
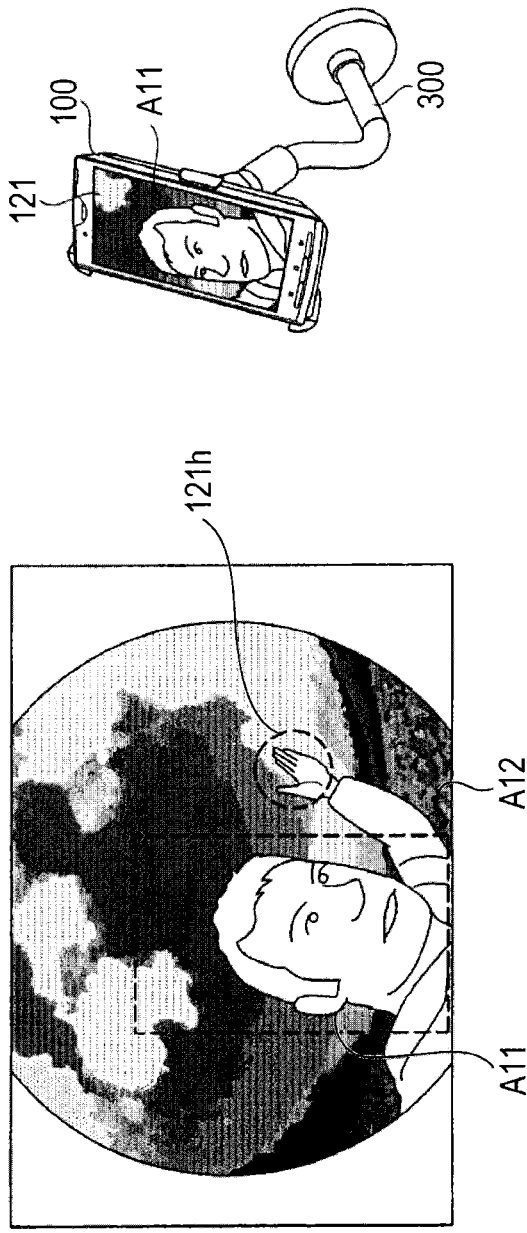
FIGS. 7A and 7B are diagrams illustrating another exemplary image capture range and another exemplary display range according to an embodiment of the present disclosure.
Figure 7B:
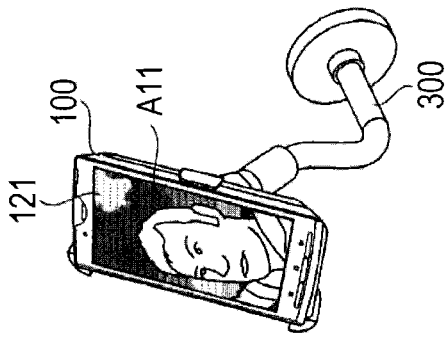

FIGS. 7A and 7B are diagrams illustrating another example of the image capturing state.

In this example, a person that is a subject stands in front of a given background image and gives an explanation of the background image. The background image is, for example, an image projected by a projector apparatus.

When such a system is provided, the in-camera unit 170 provided in the mobile phone terminal device 100 captures a wide-angle image of the surroundings of the subject. An image A12 illustrated in FIG. 7A is the image of an entire range, which is captured with the in-camera unit 170. Here, an image A11 displayed on the display panel 121 of the mobile phone terminal device 100 is an image obtained by cutting the face of the person that is the subject. FIG. 7B is a diagram illustrating the image A11 displayed on the display panel 121 of the mobile phone terminal device 100. In this example, the mobile phone terminal device 100 is held by a holding base 300.

Then, the person that is the subject performs an operation relating to the background image for the projector apparatus through the hand sign 121h made by using a hand. For example, an operation is performed to change the background image to another image based on an instruction by means of the hand sign.

In that case, in the mobile phone terminal device 100, the control unit 110 determines the instruction based on the hand sign 121h detected with the image processing unit 190 through the image recognition. When the control unit 110 determines, with the above determination, that the hand sign specifies an operation of the projector apparatus, the command corresponding to the hand sign is transmitted from the mobile phone terminal device 100 to the projector apparatus. Thus, the hand sign made beyond the display range can give an instruction to an apparatus provided outside the terminal device.

Thus, giving an instruction to the apparatus provided outside the terminal device by means of the sign made beyond the image capture range allows a photographer to control the outside apparatus by his/her own hand, etc. without affecting a captured image.

[4. Second Exemplary Modification]

Figure 8A:
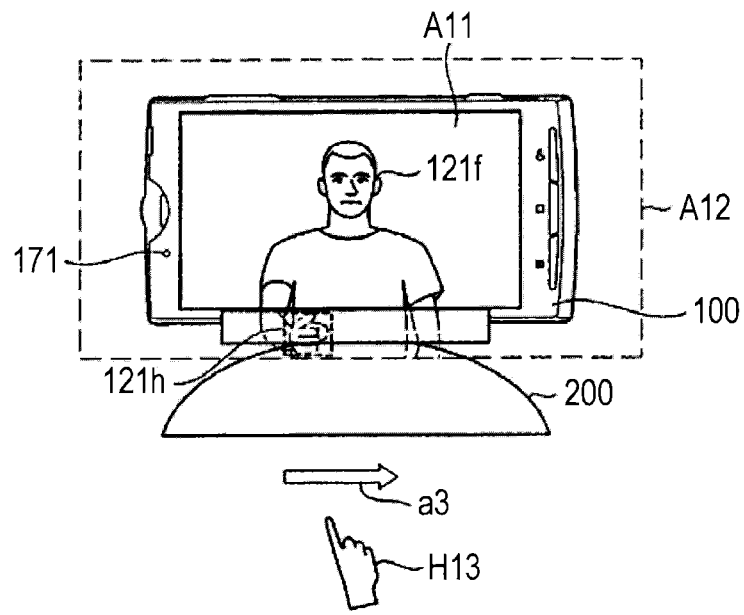
FIGS. 8A and 8B are diagrams illustrating an exemplary image capture range, an exemplary display range, and an exemplary display image according to an exemplary modification of an embodiment of the present disclosure.
Figure 8B:
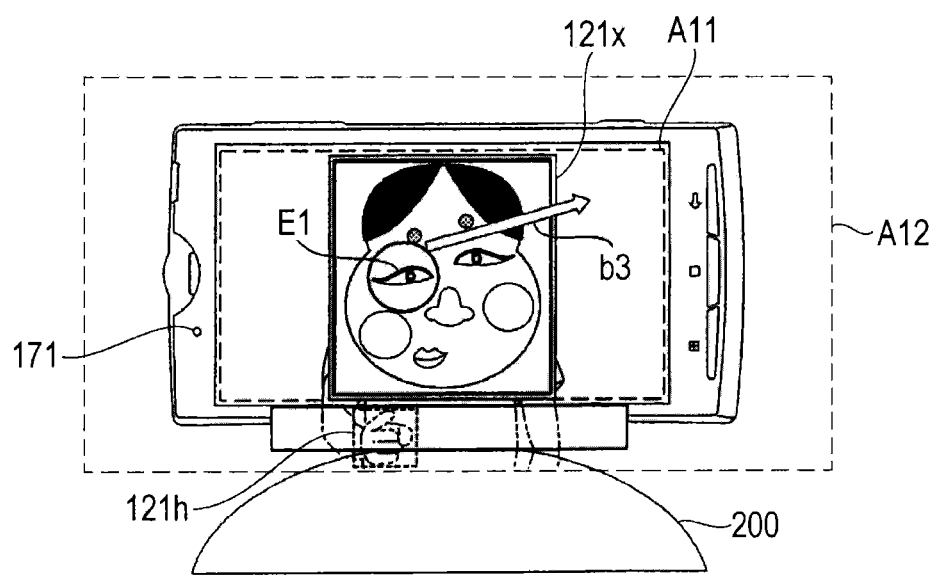

FIGS. 8A and 8B are diagrams illustrating still another example of the image capturing state.

In this example, the mobile phone terminal device 100 is executing a video game in which the image of a face captured with the in-camera unit 170 is processed. FIG. 8A illustrates an example where the in-camera unit 170 performs image capturing, and the display panel 121 displays the image. In this example, as illustrated in FIG. 8A, the hand sign 121h made by a hand of the subject is detected within an image A12 of an entire range outside an image A11 of a display range.

FIG. 8B illustrates an example where the display panel 121 displays an image 121x obtained by modifying and processing the captured face image. This example is a video game in which the positions of parts including the eyes or the nose constituting the processed face can be changed as desired in accordance with hand signs. For example, as illustrated in FIG. 8A, assuming that the user makes a hand sign H13 indicating a movement in an upper-right direction a3, the position of an eye E1 included in the processed face image 121x is then moved in a specified upper-right direction b3 as illustrated in FIG. 8B. Thus, it becomes possible to provide an instruction to execute a video game by means of the hand sign made beyond the display range.

Thus, operations are performed by means of the signs that are made beyond the display range during the execution of a video game, etc., which allows for controlling the video game without affecting a captured image.

[5. Other Exemplary Modifications]

The exemplary hand signs that are illustrated in the drawings indicate one example, and other hand signs may be applied. Further, other operations that are not described in the above-described embodiments may be executed based on hand signs. Although the examples where the control is performed based on the hand signs that are made by the shape or the motion of a hand have been described, a sign made by using anything other than the hand can also be used for the control. For example, an instruction is given through a motion such as moving a foot.

Further, in the above-described embodiments, the example where the connection is established between the mobile phone terminal device 100 configured as a smart phone and the camera base 200 is described. On the other hand, the connection may be established between another terminal device and a camera base. For example, the connection may be established between a terminal device configured as an electronic still camera and a camera base.

Further, a program (software) executing the control processing described in the flowchart of FIG. 4 may be generated, and the program may be stored in a storage medium. Preparing the program stored in the storage medium allows a terminal device in which the program is installed to be a terminal device executing the processing of the present disclosure.

The configurations and the processing that are written in the claims of the present disclosure are not limited to the examples of the above-described embodiments. It should be understood by those skilled in the art that various modifications, combinations, and other exemplary embodiments may occur depending on design and/or other factors insofar as they are within the scope of the claims or the equivalents thereof, as a matter of course.

The present disclosure may be configured as below.

(1) An information processing apparatus, including: circuitry configured to acquire image data captured by an image capturing device; perform an analysis on the image data prior to cropping the image data for display to detect a specified image from the image data; generate an image for display by cropping the image data; control a display to display the image for display; and execute predetermined processing when the specified image is detected in the image data as a result of performing the analysis on the image data prior to the cropping.

(2) The information processing apparatus of (1), further comprising: the image capturing device configured to capture the image data.

(3) The information processing apparatus of any of (1) to (2), wherein the circuitry is configured to: perform the analysis on the image data by detecting a hand in the image data; and execute the predetermined processing based on the detection of the hand in the image data.

(4) The information processing apparatus of any of (1) to (3), wherein the circuitry is configured to: perform the analysis on the image data by detecting a hand in a portion of the image data that is cropped and not included in the image for display; and execute the predetermined processing based on the detection of the hand in the portion of the image data that is cropped and not included in the image for display.

(5) The information processing apparatus of any of (1) to (4), wherein the circuitry is configured to: perform the analysis on the image data by detecting a gesture made by a hand in the image data; and execute the predetermined processing based on the detection of the gesture made by the hand in the image data.

(6) The information processing apparatus of any of (1) to (5), wherein the circuitry is configured to: perform the analysis on the image data by detecting a gesture made by a hand in a portion of the image data that is cropped and not included in the image for display; and execute the predetermined processing based on the detection of the gesture made by the hand in the portion of the image data that is cropped and not included in the image for display.

(7) The information processing apparatus of (6), wherein the circuitry is configured to: determine that the gesture made by the hand detected by the analysis on the image data corresponds to a command to rotate a base to which the information processing apparatus is coupled; and control the base to rotate based on the detected gesture made by the hand.

(8) The information processing apparatus of any of (6) to (7), wherein the circuitry is configured to: determine that the gesture made by the hand detected by the analysis on the image data corresponds to a command to change a tilt angle of a base to which the information processing apparatus is coupled; and control the base to tilt based on the detected gesture made by the hand.

(9) The information processing apparatus of any of (6) to (8), wherein the circuitry is configured to: determine that the gesture made by the hand detected by the analysis on the image data corresponds to a command to perform a zoom operation corresponding to the image for display; and control the display to enlarge the image for display based on the detected gesture made by the hand.

(10) The information processing apparatus of any of (6) to (9), wherein the circuitry is configured to: determine that the gesture made by the hand detected by the analysis on the image data corresponds to a command to perform an image capture operation; and control the image capturing device to capture an image based on the detected gesture made by the hand.

(11) A method performed by an information processing apparatus, the method comprising: acquiring image data captured by an image capturing device; performing an analysis on the image data prior to cropping the image data for display to detect a specified image from the image data; generating an image for display by cropping the image data; controlling a display to display the image for display; and executing predetermined processing when the specified image is detected in the image data as a result of performing the analysis on the image data prior to the cropping.

(12) A non-transitory computer-readable medium including computer-program instructions, which when executed by an information processing apparatus, cause the information processing apparatus to: acquire image data captured by an image capturing device; perform an analysis on the image data prior to cropping the image data for display to detect a specified image from the image data; generate an image for display by cropping the image data; control a display to display the image for display; and execute predetermined processing when the specified image is detected in the image data as a result of performing the analysis on the image data prior to the cropping.

The invention claimed is:

1. An information processing apparatus, comprising: circuitry configured to
    acquire moving image data captured by a moving image capturing device;
    generate a moving image for display by cropping the moving image data;
    perform an analysis on the moving image data by detecting a hand in a portion of the moving image data that is cropped and not included in the moving image for display;
    control a display to display the generated moving image after cropping the moving image data for display; and
    execute predetermined processing based on the detection of the hand in the portion of the moving image data that is cropped and not included in the moving image for display, wherein
    the predetermined processing comprises determining that a gesture made by the hand detected by the analysis on the moving image data corresponds to a predetermined command, and
    the circuitry is configured to control the display to display the generated moving image after cropping the moving image data for display while keeping acquiring the moving image data including the moving image data that is cropped and not included in the moving image for display so that the circuitry can execute the predetermined processing based on the detection of the hand in the portion of the moving image data that is cropped and not included in the moving image for display even after the hand in the portion of the moving image data is cropped and not included in the moving image for display.

2. The information processing apparatus of claim 1, further comprising:
    the moving image capturing device configured to capture the moving image data.

3. The information processing apparatus of claim 1, wherein the circuitry is configured to:
    determine that the gesture made by the hand detected by the analysis on the moving image data corresponds to a command to rotate the base to which the information processing apparatus is coupled; and
    control the base to rotate based on the detected gesture made by the hand.

4. The information processing apparatus of claim 1, wherein the circuitry is configured to:
    determine that the gesture made by the hand detected by the analysis on the moving image data corresponds to a command to perform a zoom operation corresponding to the moving image for display; and
    control the display to enlarge the moving image for display based on the detected gesture made by the hand.

5. The information processing apparatus of claim 1, wherein the circuitry is configured to:
    determine that the gesture made by the hand detected by the analysis on the moving image data corresponds to a command to perform a moving image capture operation; and
    control the moving image capturing device to capture a moving image based on the detected gesture made by the hand.

6. The information processing apparatus of claim 1, wherein the circuitry is configured to:
    determine that the gesture made by the hand detected by the analysis on the moving image data corresponds to a tip of a user's finger being pointed upright and rotated in a clockwise or counter clockwise direction; and control the display to enlarge or reduce a size of the moving image for display based on the detected gesture made by the hand.

7. The information processing apparatus of claim 1, wherein the circuitry is configured to:
compare a pattern of the gesture made by the hand detected by the analysis on the moving image data to stored pattern data corresponding to a command to rotate the base to which the information processing apparatus is coupled; and
control the base to rotate based on the detected gesture made by the hand when the pattern of the gesture made by the hand matches the stored pattern data.

8. The information processing apparatus of claim 1, wherein the circuitry is configured to:
compare a pattern of the gesture made by the hand detected by the analysis on the moving image data to stored pattern data corresponding to the command to change the tilt angle of the base to which the information processing apparatus is coupled; and
control the base to tilt based on the detected gesture made by the hand when the pattern of the gesture made by the hand matches the stored pattern data.

9. The information processing apparatus of claim 1, wherein the circuitry is configured to:
compare a pattern of the gesture made by the hand detected by the analysis on the moving image data to stored pattern data corresponding to a command to perform a zoom operation corresponding to the moving image for display; and
control the display to enlarge the moving image for display based on the detected gesture made by the hand when the pattern of the gesture made by the hand matches the stored pattern data.

10. The information processing apparatus of claim 1, wherein the circuitry is configured to:
compare a pattern of the gesture made by the hand detected by the analysis on the moving image data to stored pattern data corresponding to a command to perform a moving image capture operation; and
control the moving image capturing device to capture a moving image based on the detected gesture made by the hand when the pattern of the gesture made by the hand matches the stored pattern data.

11. The information processing apparatus of claim 1, wherein
the predetermined processing comprises determining that the gesture made by the hand detected by the analysis on the moving image data corresponds to a command to change a tilt angle of a base to which the information processing apparatus is coupled, and controlling the base to tilt based on the detected gesture made by the hand.

12. A method performed by an information processing apparatus, the method comprising:
acquiring moving image data captured by a moving image capturing device;
generating a moving image for display by cropping the moving image data;
performing an analysis on the moving image data by detecting a hand in a portion of the moving image data that is cropped and not included in the moving image for display;
controlling a display to display the generated moving image after cropping the moving image data for display; and
executing predetermined processing based on the detection of the hand in the portion of the moving image data that is cropped and not included in the moving image for display, wherein
the predetermined processing comprises determining that a gesture made by the hand detected by the analysis on the moving image data corresponds to a predetermined command, and
the controlling includes controlling the display to display the generated moving image after cropping the moving image data for display while keeping acquiring the moving image data including the moving image data that is cropped and not included in the moving image for display so that the circuitry can execute the predetermined processing based on the detection of the hand in the portion of the moving image data that is cropped and not included in the moving image for display even after the hand in the portion of the moving image data is cropped and not included in the moving image for display.

13. A non-transitory computer-readable medium including computer-program instructions, which when executed by an information processing apparatus, cause the information processing apparatus to:
acquire moving image data captured by a moving image capturing device;
generate a moving image for display by cropping the moving image data;
perform an analysis on the moving image data by detecting a hand in a portion of the moving image data that is cropped and not included in the moving image for display;
control a display to display the generated moving image after cropping the moving image data for display; and
execute predetermined processing based on the detection of the hand in the portion of the moving image data that is cropped and not included in the moving image for display, wherein
the predetermined processing comprises determining that a gesture made by the hand detected by the analysis on the moving image data corresponds to a predetermined command, and
the control of the display includes controlling the display to display the generated moving image after cropping the moving image data for display while keeping acquiring the moving image data including the moving image data that is cropped and not included in the moving image for display so that the circuitry can execute the predetermined processing based on the detection of the hand in the portion of the moving image data that is cropped and not included in the moving image for display even after the hand in the portion of the moving image data is cropped and not included in the moving image for display.

* * * * *